United States Patent
Michel (10) Patent No.: US 8,109,403 B2
(45) Date of Patent: Feb. 7, 2012

(54) HOPPER COVER WITH RETRACTABLE FLEXIBLE CLOSURE MEMBER

(75) Inventor: Bud Michel, St. Gregor (CA)

(73) Assignee: Michel's Industries Ltd., St. Gregor, Saskatchewan (CA)

( * ) Notice: Subject to any disclaimer, the term of this patent is extended or adjusted under 35 U.S.C. 154(b) by 1721 days.

(21) Appl. No.: 11/239,482

(22) Filed: Sep. 30, 2005

(65) Prior Publication Data

US 2007/0075082 A1    Apr. 5, 2007

(51) Int. Cl.
*B65D 51/18*   (2006.01)
*A47G 5/02*   (2006.01)
*B65D 43/20*   (2006.01)

(52) U.S. Cl. ............... 220/254.1; 220/908; 220/350; 160/241; 160/311

(58) Field of Classification Search ............ 220/350, 220/351, 908, 254.1, 254.3, 254.9; 160/241, 160/310; 99/341; 312/3, 292; 460/119
See application file for complete search history.

(56) References Cited

U.S. PATENT DOCUMENTS

| | | | |
|---|---|---|---|
| 3,667,648 A * | 6/1972 | Koziol | 126/211 |
| 3,768,540 A | 10/1973 | McSwain | |
| 4,138,154 A | 2/1979 | McKeon | |
| 4,457,444 A | 7/1984 | Wold | |
| D329,929 S * | 9/1992 | Knoedler et al. | D32/37 |
| 5,179,991 A | 1/1993 | Haddad | |
| 5,354,113 A | 10/1994 | Pettersson | |
| 5,404,926 A | 4/1995 | Ojima et al. | |
| 5,915,447 A | 6/1999 | Lassen | |
| 6,685,251 B2 | 2/2004 | Dumas | |
| 6,752,715 B2 | 6/2004 | Stephens et al. | |

FOREIGN PATENT DOCUMENTS

CA    1060927    8/1979

* cited by examiner

*Primary Examiner* — Robin Hylton
(74) *Attorney, Agent, or Firm* — Nixon & Vanderhye, P.C.

(57) ABSTRACT

A cover assembly adapted to be fitted over the open top of a bin includes a pair of spaced apart, domed rigid hoods releasably attachable to upper portions of the hopper whereby an elongated opening is defined between the hoods of sufficient width as to provide access to the hopper. A flexible closure member spans the opening between the hoods while supported on trackways extending along marginal edge portions of the hoods which bound the elongated opening. A pair of rotatable rollers are attachable, one at each of the opposing end portions of the opening. One roller is spring-loaded, upon and from which roller the closure member is wound and unwound during travel of said closure member over the elongated opening. The other roller is connected by pull cables to the closure member, and powered to provide for travel of the closure member.

9 Claims, 9 Drawing Sheets

HOPPER COVER WITH RETRACTABLE FLEXIBLE CLOSURE MEMBER

CROSS REFERENCE TO RELATED APPLICATIONS

This application claims priority to Canadian Application No. 2,520,351, filed Sep. 21, 2005.

FIELD OF THE INVENTION

This invention relates to a hopper cover assembly adapted to be fitted over the open top of a bin or hopper, preferably a hopper forming part of an agricultural combine harvester.

BACKGROUND OF THE INVENTION

It is known to provide various cover assemblies adapted to extend over the open top of a rectangular bin or hopper. Such cover assemblies typically employ an elongated flexible cover having a length and width sufficient to completely cover the open top of the bin or hopper. A spring loaded roller is rotatably mounted at one side or end of the receptacle to which a first end of the cover is attached. A cable spool is rotatably mounted at the opposing end of the bin or hopper and is connected by elongated cables to the flexible cover. A drive motor causes the cable spool to rotate in such a way that the cover assembly has a first covered configuration in which the cover is unwound from the spring loaded roller and extends over the top of the bin or hopper, and a second uncovered configuration which the cover is wound about the spring loaded roller and the top of the bin or hopper is uncovered. These types of covers assemblies perform reasonably well in various situations e.g. when used to cover and uncover the open top of an elongated rectangular box such as an open bed trailer adapted to be moved by a truck along a highway. However, these forms of cover systems are not well suited for use with various types of equipment such as agricultural combine harvesters having open top hoppers leading into the harvester's grain tank. Bins or hoppers for these types of equipment are usually of a non-rectangular shape thus requiring specially shaped covers capable of extending over the open top of the harvester's grain tank. Specialty covers previously provided typically included a waterproof fabric intended to prevent rainwater and other debris from contacting grain that accumulates in the harvester's grain tank. Many such earlier covers were cumbersome structures requiring considerable time and the use of tools to assemble and disassemble same. Typical covers may include fabric that is poorly fitted thus allowing undesirable pools of water to collect in pockets defined between portions of a support frame. The accumulated water can eventually leak through and contact the grain tank. Still other prior art covers required considerable work to disassemble and remove same from the top of the harvester to provide clearance enabling the combine to pass beneath obstructions such as when passing through a barn door.

SUMMARY OF THE INVENTION

It is a basic objective of the present invention to provide an improved cover assembly adapted to be fitted over the open top of a bin or hopper, such as the bin or hopper associated with an agricultural combine harvester, and which improved cover assembly is intended to alleviate certain disadvantages associated with the currently available prior art structures.

The invention in one aspect provides a cover assembly adapted to be fitted over the open top of a bin or hopper and includes a pair of hoods attachable to upper portions of the bin or hopper in spaced relation to each other such that an elongated opening is defined between said hoods of sufficient width as to provide access to the bin or hopper when in use. A flexible closure member is adapted to span the opening between said hoods while supported on marginal edge portions of said hoods which bound said elongated opening. A pair of rotatable rollers, each attachable at a respective one of opposing end portions of said elongated opening are provided and upon and from one of which rollers said closure member may be wound and unwound during travel of said closure member along and over said elongated opening whereby to open and close the same.

As a preferred feature of the invention said marginal edge portions of said hoods have trackways defined therein adapted to mate with opposing longitudinal edge portions of said closure member whereby to guide the latter when moving between open and closed positions.

According to a further preferred feature said opposing longitudinal edge portions of said closure member include respective elongated reinforcement strips which are slidably received in said hood trackways; a pair of pull cables slidable in said trackways and extending beyond and connected to one end of said closure member, said pull cables also being connected to the other one of said pair of rollers so as to be wound and unwound therefrom as said closure member is moved between the closed and open positions.

In a preferred embodiment, one of said rollers is connected to a motor to positively rotate that roller, with the other roller being spring loaded whereby to maintain tension on the flexible closure member and to wind up or allow unwinding of the closure member depending on the direction of rotation of the motor driven roller.

The pull cables are preferably connected to said motor driven roller with the spring loaded roller being connected to said closure member.

The pull cables and the reinforcement strips preferably comprise elongated belts, said reinforcement strips being attached along opposing sides of said closure member to define said longitudinal edge portions of the closure member which mate with the trackways defined in said hoods.

As a further desirable feature, the hoods have an upwardly domed shape such that when said closure member is in the closed position over said elongated opening, central portions of the closure member are raised above opposing ends thereof in an arch-like manner thereby to shed rain or other precipitation.

The hoods are preferably made of a rigid or semi-rigid plastics material with clamps being located at peripheral portions of said hoods to secure same to the upper portions of said open topped bin or hopper.

Further features of the invention are described and claimed hereafter.

BRIEF DESCRIPTION OF THE DRAWINGS

An embodiment of the present invention will now be described, presented by way of example only with reference to the accompanying drawings in which:

FIGS. 8, 9 and 10 are perspective, side elevation and end elevation views respectively of the spring loaded roller assembly upon which the flexible closure member is wound and unwound during movement thereof between the open and closed positions. (FIG. 9 is partly cut away to show the internal spring loading structure for the roller).

DETAILED DESCRIPTION OF PREFERRED EMBODIMENT

Referring now to the drawings, particularly FIGS. 1-4, there is shown a cover assembly 20 according to a preferred embodiment of the invention and which is adapted to be fitted over the open top of the grain bin or hopper 22 of an agricultural combine 24. The cover assembly 20 includes a pair of substantially rigid hoods 26 which are attachable to upper portions of the bin or hopper 22 in spaced apart relation to each other such that an elongated opening 28 is defined between the two hoods 26. The elongated opening 28 is of sufficient width as to provide access to the bin or hopper when in use. A flexible closure member 30 adapted to span the elongated opening 28 between the hoods 26 is supported on marginal edge portions 32 of the hoods which bound the elongated opening and extend along its longitudinal edges in parallelism to each other. It will also be seen that a pair of rotatable rollers are each attachable at a respective one of the opposing end portions of the elongated opening 28. A first one 34 of these rollers serves to provide for the winding up and unwinding of the flexible closure member 30 during travel of the closure member along and over the elongated opening 28 thereby to open and close the same. The other roller 36 is motor driven and connected to the closure member 30 via pull cables, all of which will be described hereafter.

Figure 11:
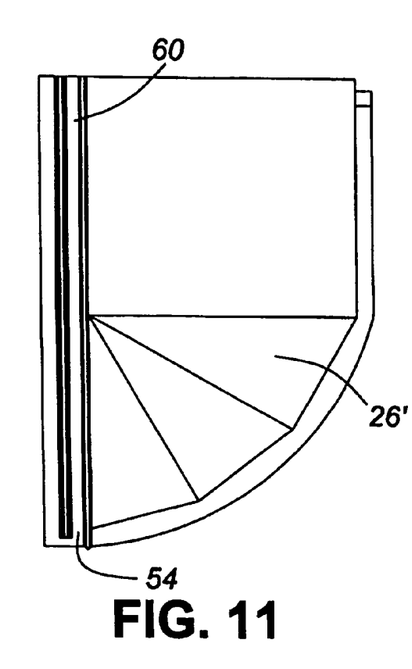
FIG. 11 is a top plan view of a hood half section.
Figure 12:
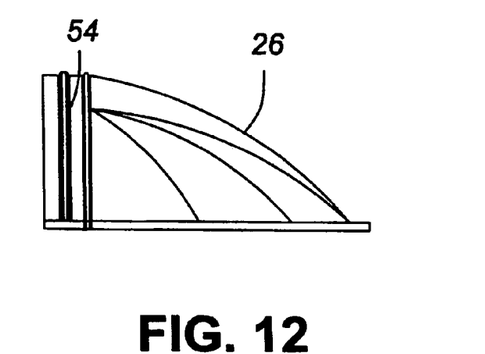
FIG. 12 is an end elevation view of the hood.
Figure 13:
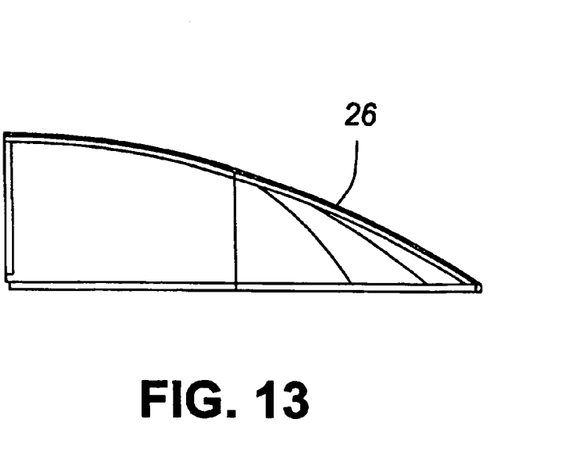
FIG. 13 is a side elevation view of the hood half section.

Referring to FIGS. 1-4 of the drawings as well as FIGS. 11-13, it will be seen that the hoods 26 each have an upwardly domed shape such that when the flexible closure member 30 is in the closed position over the elongated opening 28, central portions of the closure member are raised above opposing ends thereof in an arch-like manner thereby to shed rain or other precipitation. As seen from above, the hoods have outer peripheral margins shaped to correspond approximately to the outline shape of the hopper 22.

Figure 16:
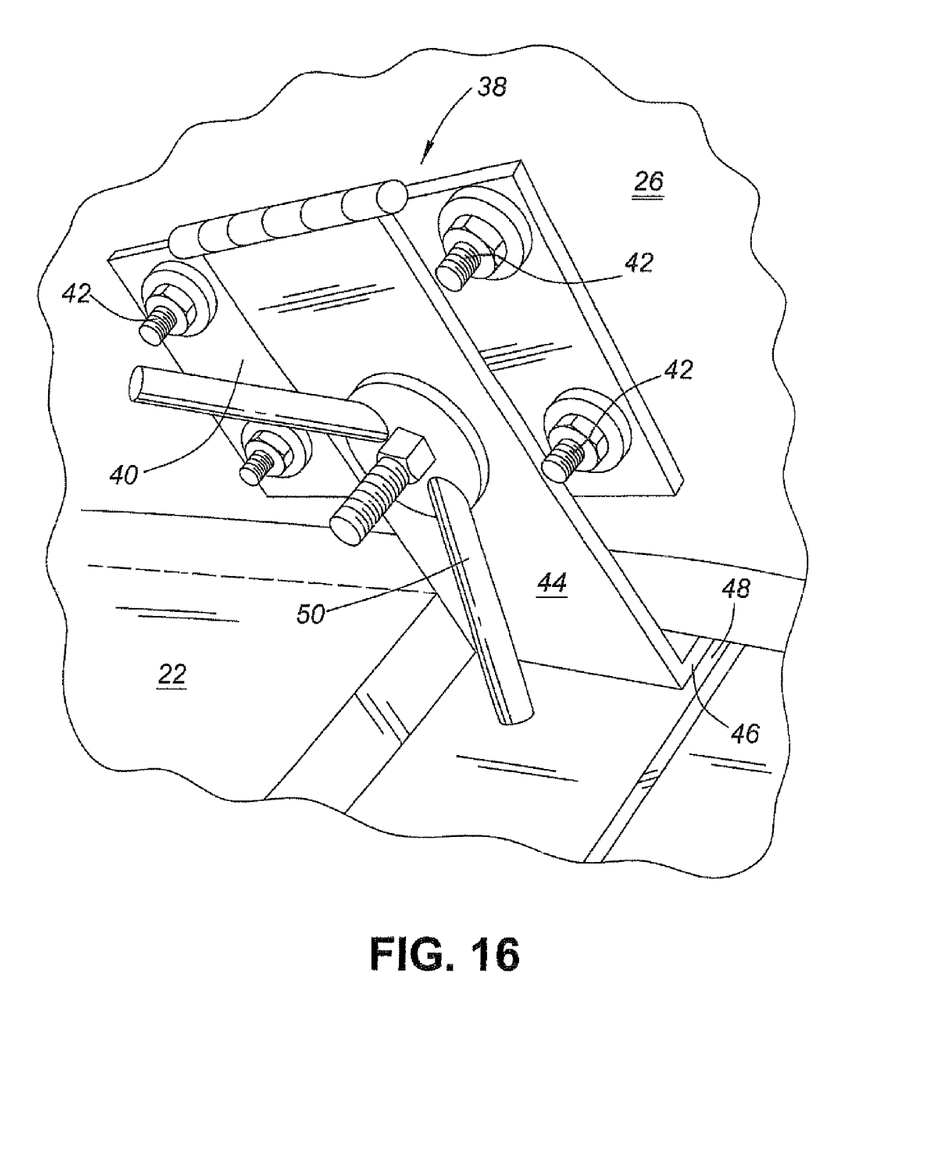
FIG. 16 is a perspective view showing a clamp located at a peripheral portion of a hood for securing same to an edge portion of the open topped bin or hopper.

The hoods 26 are preferably made of a weatherproof rigid or semi-rigid plastics material such as fibreglass or high density polyethylene with clamps 38 (see FIG. 16) or other fastening means being located at peripheral portions on the interior of the hoods in spaced apart relation to secure same to upper marginal portions of the open topped bin or hopper 22. As seen in FIG. 16, these clamps 38 each comprise hinge like members 40 bolted (42) to the underside of the hood 26 and including a hinged plate 44 having an inwardly turned lip 46 at its lower extremity which engages with the edge of a pocket 48 formed on the inside surface of the combine hopper 22. A winged threaded nut 50 engages a threaded bolt on the clamp and can be tightened to firmly secure the hood 26 to the upper extremities of the open topped bin or hopper. As many clamps 38 are provided as are required under the circumstances.

Figure 14:
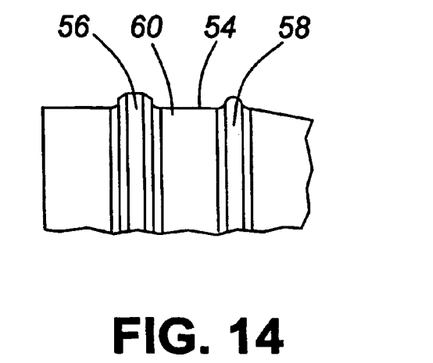
FIG. 14 is a view of a marginal edge portion of a hood showing the trackways defined therein and along which the closure member travels.

The individual hoods 26 (FIGS. 11-13) may be of unitary construction, but for large hoods they may each be made in two parts 26' which are suitably connected together by fasteners (not shown). In addition, when the hoods 26 are mounted in their opposed spaced apart relationship as shown in FIGS. 1-4, an elongated bar 52 is attached to the mid-point of each hood at the marginal edges thereof and spans the opening 28 therebetween. This bar 52 serves to stabilize the hoods and assists in maintaining parallelism between the marginal edge portions 32 of the hoods. Edge portions 32 have trackways 54 defined therein which are configured so as to mate with opposing longitudinal edge portions of the flexible closure member 30 thereby to assist in guiding the latter when moving between open and closed positions. These trackways 54 are best illustrated in FIG. 14 and it will be seen that each trackway 54 is defined by a spaced pair of raised ridges 56, 58 integrally molded with the plastic of the hood 26 and defining a shallow flat-bottomed valley 60 therebetween which serves to receive the elongated pull cables and reinforcing strips associated with the flexible closure member and which will now be described.

Figure 15:
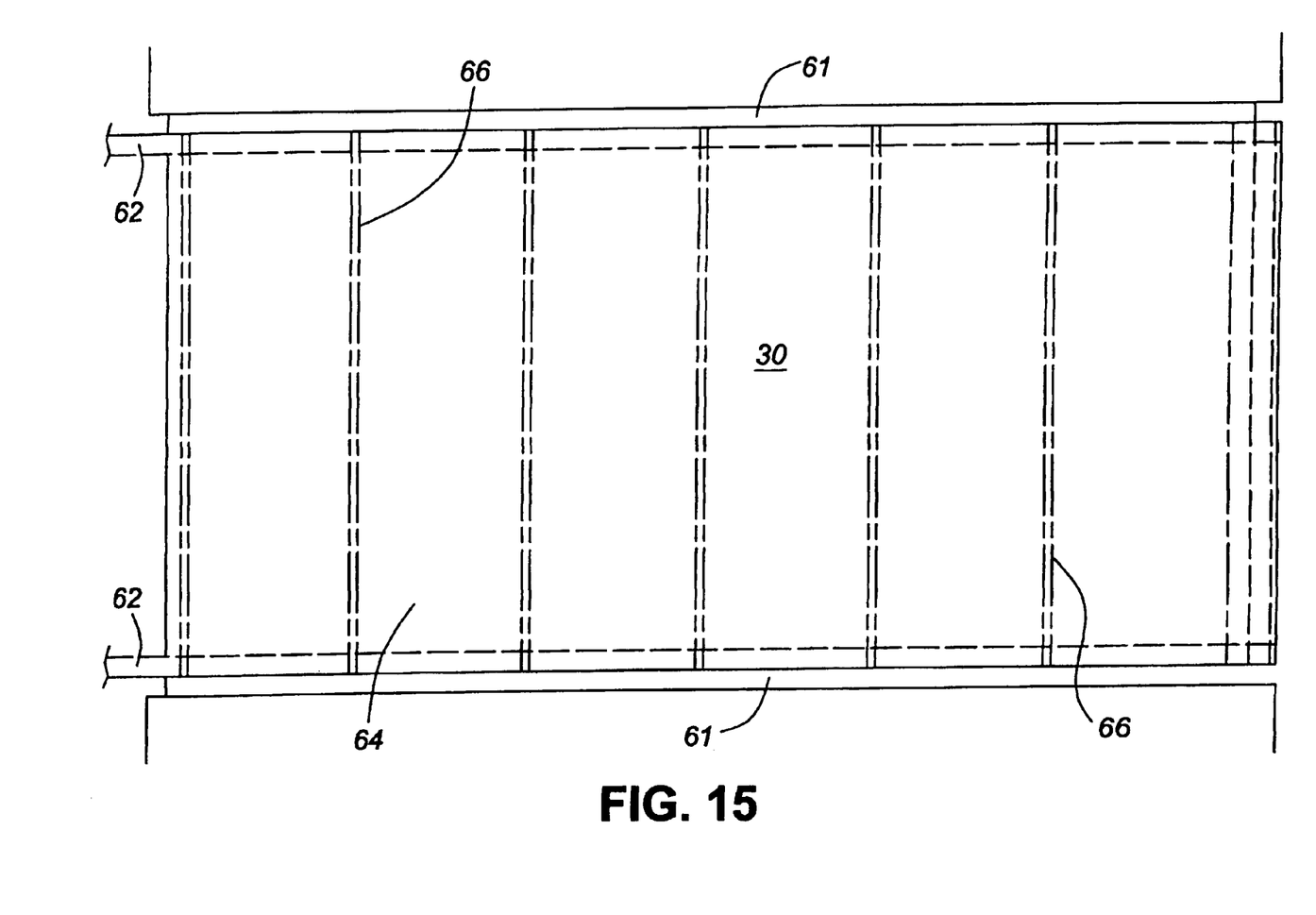
FIG. 15 is a plan view of the flexible closure member.

Referring to FIGS. 11-14 as well as FIG. 15, it will be seen that the opposing longitudinal parallel edges of the flexible closure member 30 include respective elongated reinforcing strips 61 which are slidably received in the above-described hood trackways 54. These spaced apart reinforcing strips 61 are connected to respective pull cables or straps 62, which extend beyond the one end of the flexible closure member 30 and, as noted above, are connected to the motor driven roller 36 so as to be wound and unwound therefrom as the closure member moves between the closed and open positions. The pull cables 62 and reinforcing strips 61 both preferably comprise elongated woven synthetic fabric belts (the same or similar to automotive safety seat belts) with reinforcing strips 61 being stitched along opposing sides of the flexible closure member 30 to define longitudinal edge portions thereof and which, as noted above, along with pull cables 62 mate with the trackways 54 defined in the hoods.

The flexible closure member 30 itself essentially comprises an elongated rectangular fabric member 64, typically of heavy tarpaulin canvas and treated with water-repellent materials, or impregnated with plastics material such as vinyl, or made of Neoprene™ or similar material, thereby to shed water and other precipitation. Such fabrics are well-known and readily available commercially. It might also be noted that the closure member is provided with spaced apart parallel transverse rigid rod members 66 extending between the above-noted reinforcing strips 61 and firmly stitched to the closure member fabric thereby to prevent sagging of the closure member into the elongated opening 28 to prevent pooling of water therein, etc.

Referring to FIGS. 2, 4 and 5-7, it will be seen that the above-noted motor driven roller 36 is connected to an electric motor 70 via a gear box 72 to positively rotate that roller. Roller 36 is provided adjacent its opposing ends with spaced apart flanges 76 serving as a guide so as to cause the pull cables 62 to be neatly wound up thereon when the cover member is in the closed position as shown for example in FIG. 4. The motor and gear box (70, 72) combination which drives this roller 36 may be of a well-known commercially available variety. The motor driven roller 36 is provided with an elongated mounting bracket 80 having L-shaped end portions 82 which serve to support bearings 84 for rotatably mounting the roller 36. The elongated bracket 80 is provided with spaced holes thereby permitting the bracket to be bolted or otherwise suitably mounted to an upper portion of the bin or hopper 22 of the combine.

Figures 8, 9, 10:
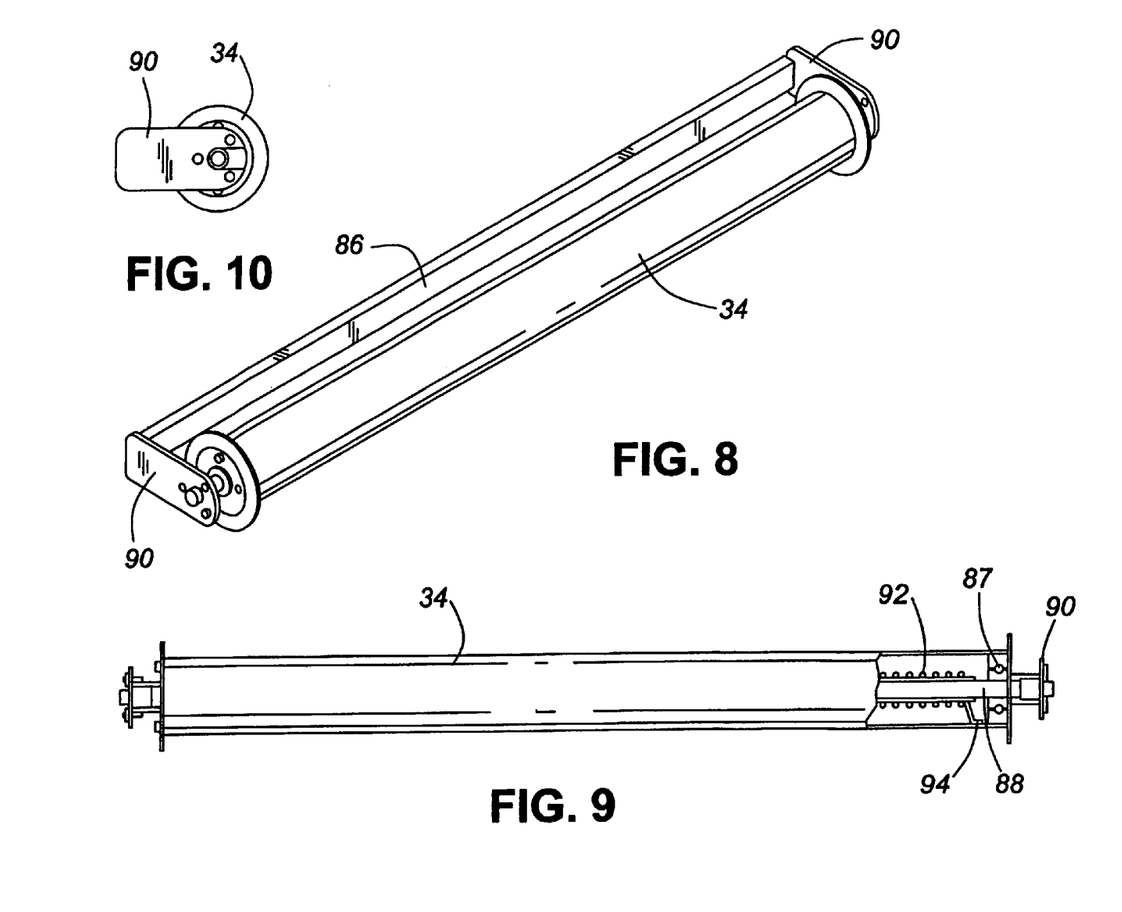

The spring loaded roller 34 (FIGS. 8-10) is also provided with a mounting bracket 86 similar to that described above for the powered roller 36 and it, likewise, is bolted to an upper portion of the bin or hopper and, as noted previously, the two rollers 34, 36, when mounted, are located at and just below respective opposing end portions of the elongated opening 28 defined between the spaced pair of hoods 26. The spring loaded roller 34 is of a generally well-known construction, per se, with the roller body being coaxially mounted on an axle shaft 88 extending between end portions 90 of the mounting bracket 86 by way of bearing assemblies 87 attached to each end of the roller. Coaxially mounted about the axle 88 is a coil spring 92, one end of which is fixed to the axle 88 while the other end of the coil spring is attached to the roller at 94. As the roller 34 rotates to permit the flexible closure member to be extended, the coil spring 92 is torsioned about the axle 88 and serves to bias the roller to rotate in the opposite direction thus tensioning the flexible closure member 30 and tending to retract the same.

Figure 1:
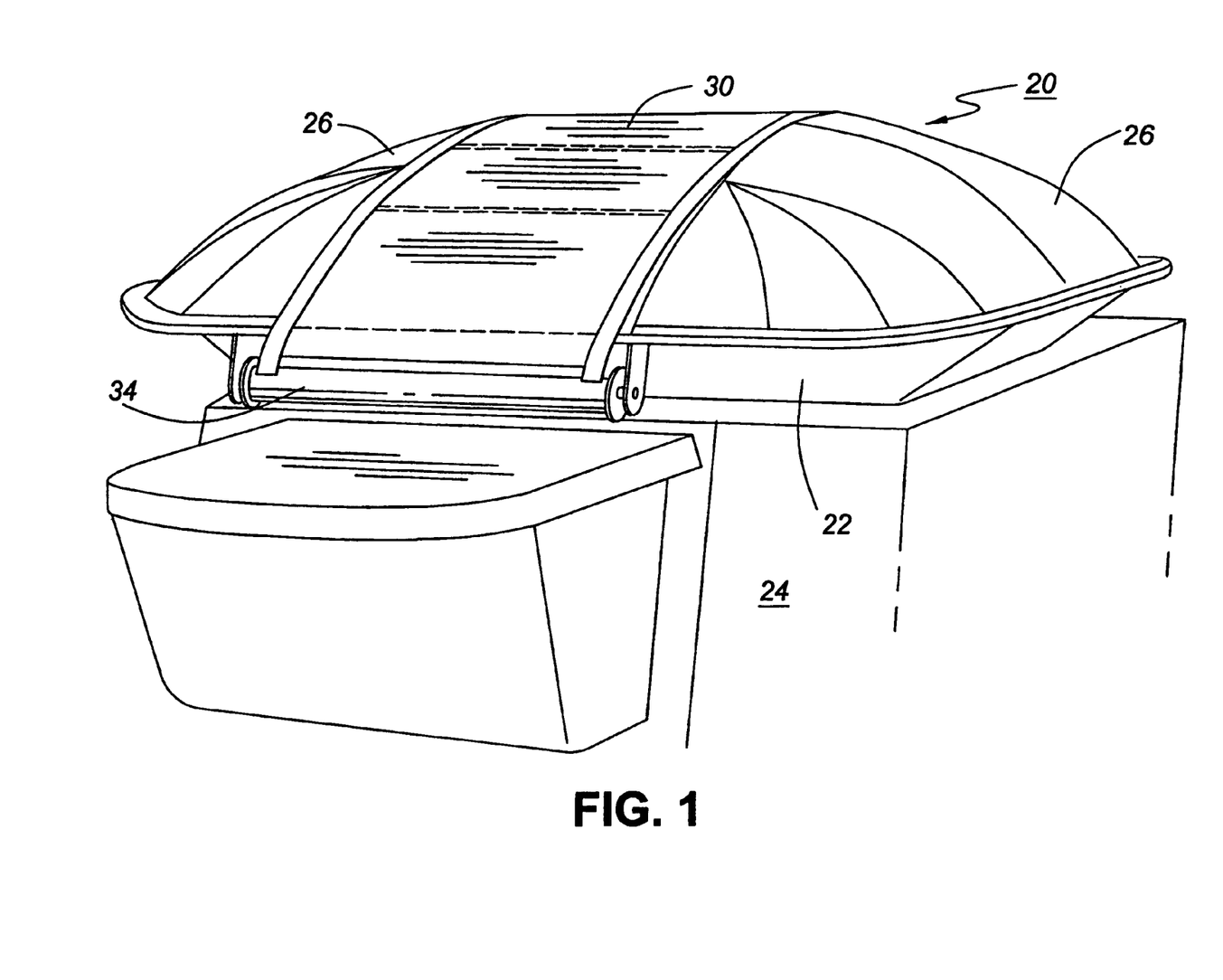
FIG. 1 is a front perspective view of a cover assembly in accordance with an embodiment of the present invention in the closed configuration when fitted over the grain tank of an agricultural combine harvester.
Figure 2:
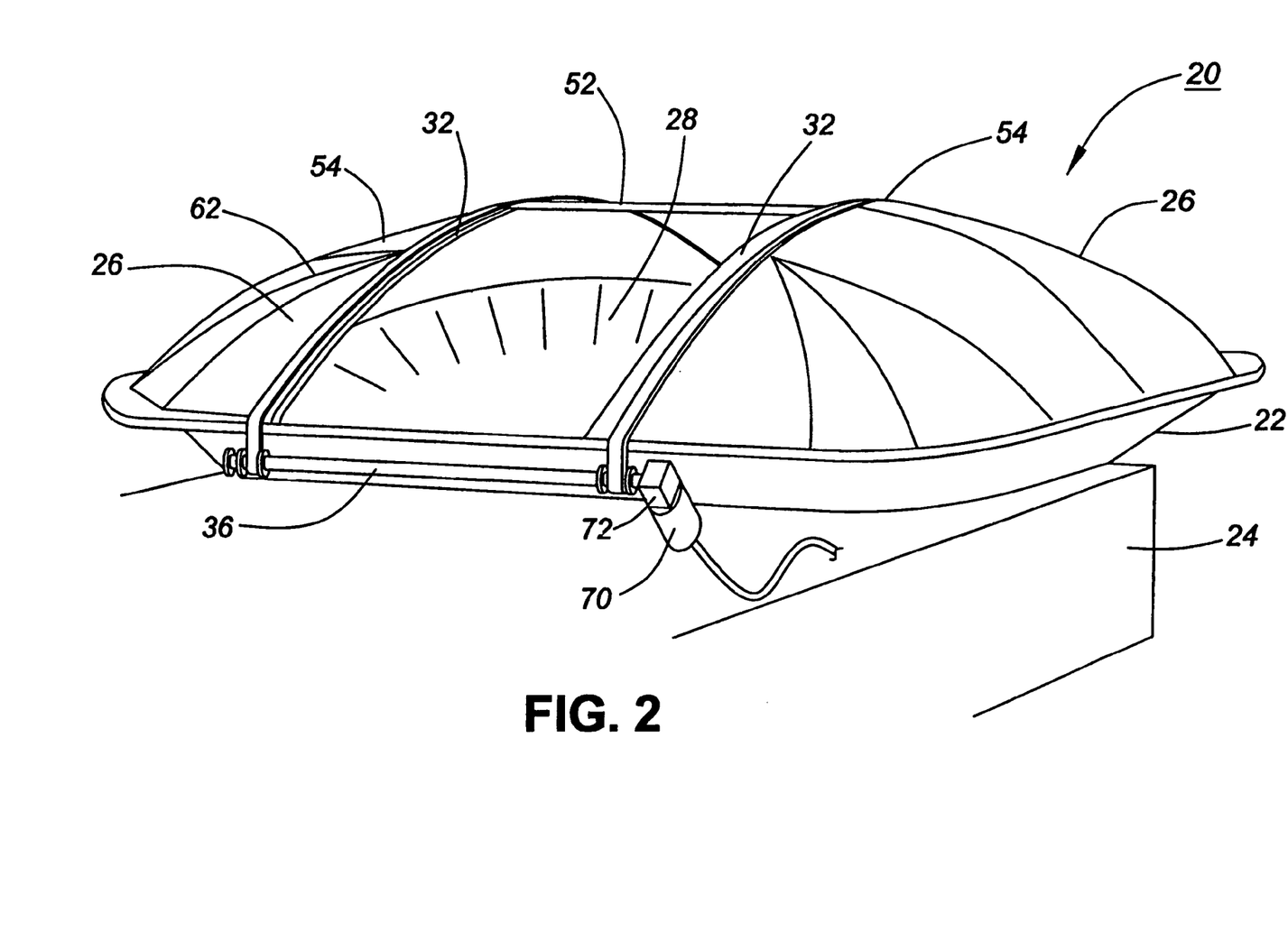
FIG. 2 is a rear perspective view of the cover assembly shown in FIG. 1 but in the open configuration.

The operation of the cover assembly will be readily understood from the above description. With the flexible closure member 30 in the open position as shown in FIG. 2, activation of the motor driven roller 36 causes the pull cables 62 to be gradually wound up on roller 36 with the pull cables and reinforcement strips 61 sliding along the trackways 54 in the hoods 26 and causing the closure member 30 to be gradually unwound from the spring loaded roller 34. This action proceeds until the flexible closure member has been fully advanced to the closed position shown in FIGS. 1 and 4 at which point a suitably positioned limit switch, not shown, shuts off power to the roller drive motor 70.

Figure 3:
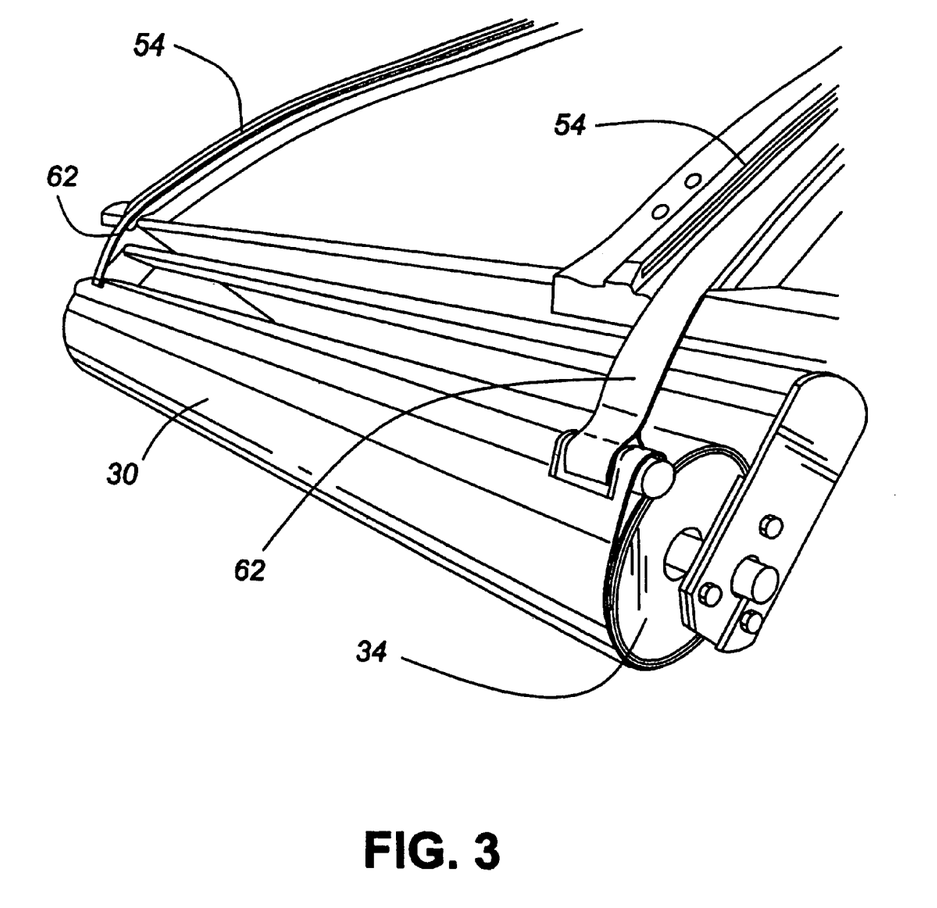
FIG. 3 is a front perspective view of a frontal portion of the cover assembly shown in FIG. 1 and showing the spring loaded roller upon which the flexible closure member is fully wound.
Figure 4:
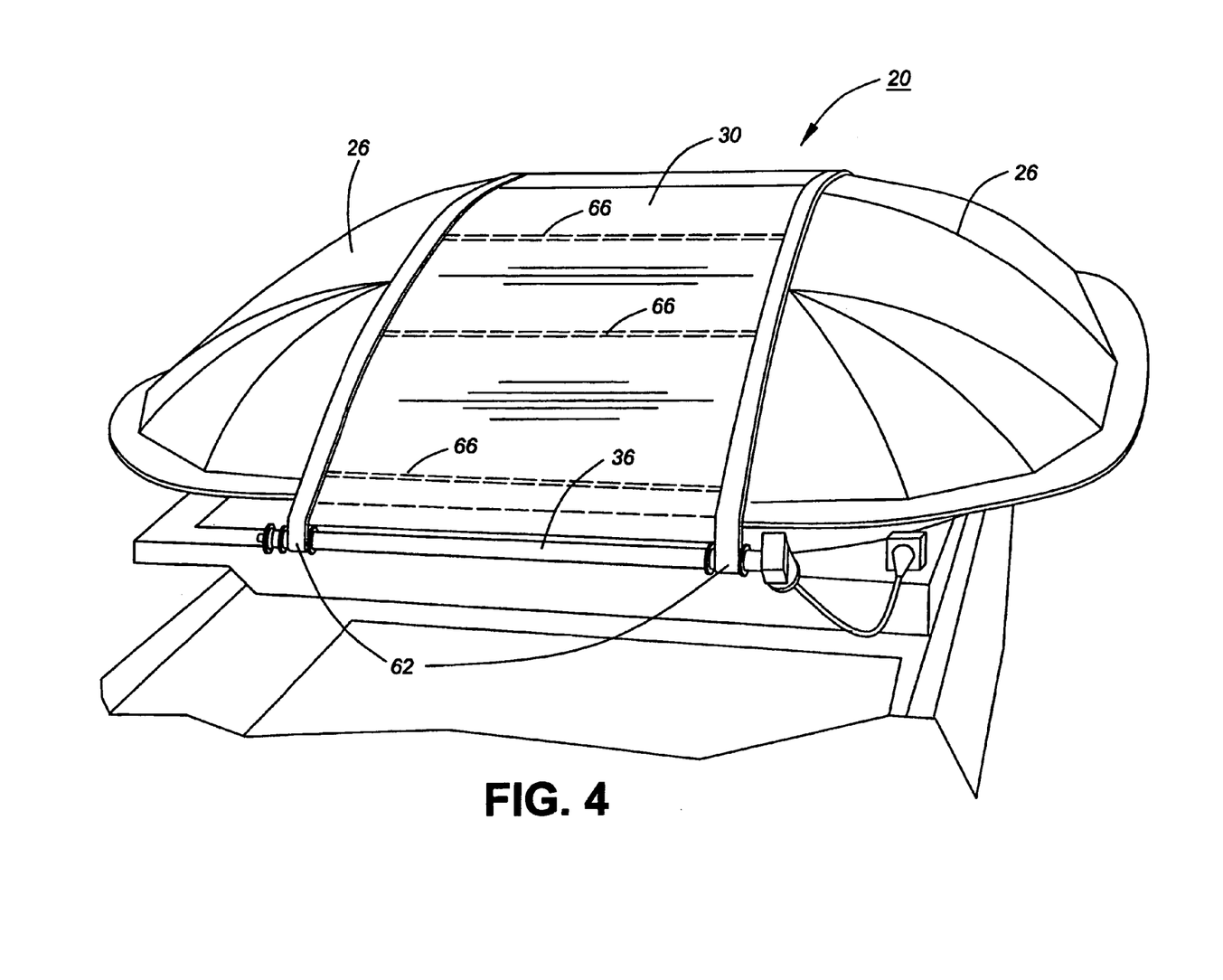
FIG. 4 is a further rear perspective view of the cover assembly with the flexible closure member in the closed position and also showing the motor driven roller upon which the pull cables connected to the flexible closure member are wound and unwound as the closure member is moved between the open and closed positions.
Figures 5, 7:
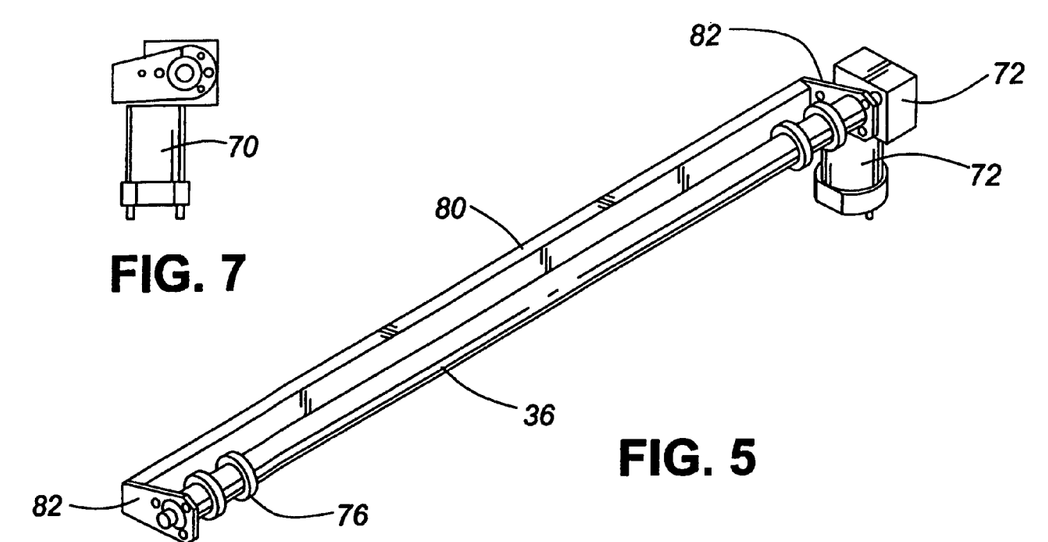
FIGS. 5, 6 and 7 are perspective, side elevation and end elevation views respectively of the motor driven roller assembly to which the above-noted elongated pull cables are connected.
Figure 6:
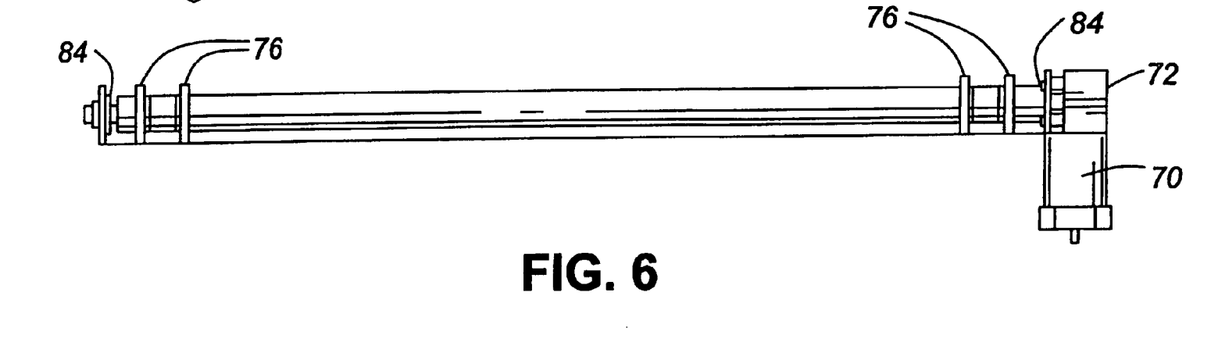

When it is desired to move the closure member 30 to the open position, the roller drive motor 70 is activated to rotate in the opposite direction thus slowly unwinding the pull cables 62 and allowing the spring loaded roller 34 to rotate and gradually wind up the flexible closure member thereon. This action continues until the fully opened position is reached as illustrated in FIGS. 2 and 3, with FIG. 3 in particular showing the spring loaded roller 34 with the closure member 30 completely wound up thereon and the pull cables 62 extending therefrom over and along their respective trackways 54 in the opposed hoods.

It will be appreciated that the cover assembly as described, causes the flexible closure member 30 to remain under tension at all times, which closure member may be extended or retracted fully or to any degree required. It will also be appreciated that the trackways 54 in association with the reinforcement strips 61 extending along the longitudinal edges of the tensioned closure member 30 serve to maintain an efficient seal between the side edges of the closure member 30 and the domed hoods 26 thus preventing ingress of water and other contaminants into the bin or hopper on which the cover assembly 20 is mounted.

A preferred embodiment of the invention has been described by way of example. Those skilled in the art will realize that various modifications and changes may be made while remaining within the spirit and scope of the invention. Hence the invention is not to be limited to the embodiment as described but, rather, the invention encompasses the full range of equivalencies as defined by the appended claims.

The invention claimed is:

1. A cover assembly adapted to be fitted over the open top of a bin or hopper and comprising a pair of hoods attachable to upper portions of the bin or hopper in spaced relation to each other such that an elongated opening is defined between said hoods of sufficient width as to provide access to the bin or hopper when in use, a flexible closure member adapted to span the opening between said hoods while supported on marginal edge portions of said hoods which bound said elongated opening, and a pair of rotatable rollers each attachable at a respective one of opposing end portions of said elongated opening and upon and from one of which rollers said closure member may be wound and unwound during travel of said closure member along and over said elongated opening whereby to open and close the same, the flexible closure member having one or more pull straps extending beyond and connected to one end of said closure member, said pull straps also being connected to the other one of said pair of rollers so as to be unwound and wound therefrom as said closure member is moved between the closed and open positions.

2. The cover assembly of claim 1 wherein said marginal edge portions of said hoods have trackways defined therein adapted to mate with opposing longitudinal edge portions of said closure member whereby to guide the latter when moving between open and closed positions.

3. The cover assembly of claim 2 wherein said opposing longitudinal edge portions of said closure member include respective elongated reinforcement strips which are slidably received in said hood trackways; and wherein said one or more pull straps comprise a pair of pull straps slidable in said trackways.

4. The cover assembly of claim 3 wherein one of said rollers is connected to a motor to positively rotate that roller, with the other roller being spring loaded whereby to maintain tension on the flexible closure member and to wind up or allow unwinding of the closure member depending on the direction of rotation of the motor driven roller.

5. The cover assembly of claim 4 wherein said pull straps are connected to said motor driven roller with the spring loaded roller being connected to said closure member.

6. The cover assembly of claim 3 wherein said pull cables and said reinforcement strips comprise elongated belts, said reinforcement strips being attached along opposing sides of said closure member to define said longitudinal edge portions of the closure member which mate with the trackways defined in said hoods.

7. The cover assembly of claim 1 wherein said hoods have an upwardly domed shape such that when said closure member is in the closed position over said elongated opening, central portions of the closure member are raised above opposing ends thereof in an arch-like manner thereby to shed rain or other precipitation.

8. The cover assembly of claim 1 wherein said hoods are made of a rigid or semi-rigid plastics material with clamps being located at peripheral portions of said hoods to secure same to the upper portions of said open topped bin or hopper.

9. The cover assembly of claim 1 wherein said closure member is provided with spaced apart transverse rod members adapted to prevent substantial sagging of the closure member into said elongated opening when in the closed position over said opening.

* * * * *